US007125336B2

United States Patent
Anttila et al.

(10) Patent No.: US 7,125,336 B2
(45) Date of Patent: Oct. 24, 2006

(54) DISTRIBUTED GAME OVER A WIRELESS TELECOMMUNICATIONS NETWORK

(75) Inventors: Akseli Anttila, Helsinki (FI); Mikko Makipaa, Helsinki (FI); Petteri Saarinen, Helsinki (FI); Toni Kopra, Espoo (FI); Hemant Madan, Espoo (FI); Oleg Beletski, Helsinki (FI); Barbara Heikkinen, Espoo (FI)

(73) Assignee: Nokia Corporation, Espoo (FI)

( * ) Notice: Subject to any disclaimer, the term of this patent is extended or adjusted under 35 U.S.C. 154(b) by 675 days.

(21) Appl. No.: 10/017,382

(22) Filed: Dec. 18, 2001

(65) Prior Publication Data

US 2003/0114224 A1 Jun. 19, 2003

(51) Int. Cl.
*A63F 13/00* (2006.01)

(52) U.S. Cl. ....................................................... 463/40
(58) Field of Classification Search ................ 463/7, 463/9, 30, 35, 39, 40–43; 273/430–432
See application file for complete search history.

(56) References Cited

U.S. PATENT DOCUMENTS

| 5,508,731 | A | | 4/1996 | Kohorn |
| 5,618,045 | A | * | 4/1997 | Kagan et al. ................. 463/40 |
| 5,660,389 | A | * | 8/1997 | Freda, III .................... 273/249 |
| 5,779,549 | A | | 7/1998 | Walker et al. |
| 5,855,515 | A | | 1/1999 | Pease et al. |
| 5,916,024 | A | | 6/1999 | Von Kohorn |
| 5,947,824 | A | | 9/1999 | Minami et al. |
| 5,999,808 | A | | 12/1999 | LaDue |
| 6,009,458 | A | | 12/1999 | Hawkins et al. |
| 6,012,984 | A | | 1/2000 | Roseman |
| 6,022,023 | A | | 2/2000 | Ford, Jr. |
| 6,171,188 | B1 | | 1/2001 | Elstner |
| 6,340,159 | B1 | | 1/2002 | Giangrante |
| 6,347,086 | B1 | | 2/2002 | Strachan |
| 6,688,982 | B1 | * | 2/2004 | Moodie et al. ............... 463/41 |
| 2002/0004424 | A1 | * | 1/2002 | Nelson et al. ................ 463/42 |
| 2002/0133562 | A1 | * | 9/2002 | Newnam et al. ............ 709/216 |
| 2002/0174248 | A1 | * | 11/2002 | Morriss ....................... 709/238 |
| 2003/0052456 | A1 | * | 3/2003 | Lasko et al. ................ 273/430 |

FOREIGN PATENT DOCUMENTS

| EP | 1 110 587 A | 6/2001 |
| EP | 1 159 994 A | 12/2001 |
| WO | WO 02/20111 A | 3/2002 |
| WO | WO 02/070088 A | 9/2002 |
| WO | WO 02/087267 A | 10/2002 |

\* cited by examiner

*Primary Examiner*—Kim Nguyen
(74) *Attorney, Agent, or Firm*—Banner & Witcoff, Ltd.

(57) ABSTRACT

A method and system for playing a distributed game over a wireless telecommunications network is disclosed. The game is initiated when a game server sends a task (e.g., a question) to a first group of mobile terminals. Each mobile terminal may either respond to the task (e.g., submit an answer) or forward the task to another mobile terminal. Once a mobile terminal forwards the task, that mobile terminal no longer retains the task. The game ends when a mobile terminal submits a correct task response, when a global time limit ends, or when all mobile terminals have submitted incorrect responses. Responses and forwards can be sent using any known data messaging technique.

21 Claims, 4 Drawing Sheets

DISTRIBUTED GAME OVER A WIRELESS TELECOMMUNICATIONS NETWORK

FIELD OF THE INVENTION

The invention relates generally to wireless telecommunications networks. More specifically, the invention provides a method and system for performing a distributed game over a wireless telecommunications network.

BACKGROUND OF THE INVENTION

Corporate entities often use games and contests to promote their goods and services. For example, television networks broadcast TV game shows to entice viewers to watch that network's TV channel. Radio broadcasters often run contests where a listener calls in when a specific song is playing to win a prize, thus enticing listeners to tune their radios to that specific station. In addition, contests are often used to entice consumers to buy one product over another. For example, fast food restaurants often sponsor contests whereby consumers get a free contest game piece when they purchase a specific item at the fast food restaurant, thus enticing consumers to patronize that restaurant.

Team or relay contests are also known in the art. In other team contests, multiple team members each attempt, but only one team member actually performs, a single objective. For example, at certain instances during the game show FAMILY FEUD®, each team member may submit a response, but only one team member's response is submitted to the show host. During the game show WHO WANTS TO BE A MILLIONAIRE, a contestant can ask a second individual for the answer to a question, but the contestant ultimately submits the response.

The advent of email, instant messaging, short message service (SMS) and other known data messaging services provide new interactive capabilities for personal communications and media delivery. For example, two or more personal digital assistants (PDAs) can each be used to play a peer-to-peer multiplayer game, communicating via each PDA's infrared communications port. In addition, mass media such as radio and television is becoming increasingly interactive. Digital TV is becoming more widespread and radio is routinely broadcast over alternative mediums, such as the Internet. In addition, the use of legacy methods such as SMS data messaging in wireless telecommunications networks is increasing.

However, there presently is no interactive game or contest for use with wireless telecommunications networks that allow contestants in a team or relay environment to take advantage of these newer messaging capabilities. Thus, it would be an advancement in the art to provide a method and system for playing a game over a communications network in which users could forward a game task to new players or respond to the task themselves. It would be a further advancement in the art to develop an interactive game played over a wireless communications network, and that can be adapted for play in a cross-media environment.

BRIEF SUMMARY OF THE INVENTION

To overcome limitations in the prior art discussed above, and to overcome other limitations that will be apparent upon reading and understanding the present specification, the present invention is directed to provide a system and method for playing a game, such as a question and answer or task-oriented game, over a wireless telecommunications network using a gamer server to administer the game to each player and monitor the game's progress. The game server initially sends a task (e.g., a question), to various players' mobile units. Each player may either attempt to perform the task (e.g., answer the question) or forward the task to another player. The game ends either when a player performs the task correctly (e.g., by providing the correct answer) or when a time limit for the game has expired.

Different variations of the game include allowing players to only forward tasks to players on their own team and taking away a player's ability to forward a task when the player performs a task incorrectly (e.g., providing an incorrect answer to a question). A player may be required to register with the game server prior to taking part in the game. In addition, players might be allowed to only forward tasks to other players that have not already received the same task, thus creating player branches with mutually exclusive players.

The game server may provide hints to one or more players during the game, and players may be allowed to provide hints to other players under predefined circumstances. In addition, the game server may output game status information that indicates how many times and to whom a task has been forwarded. An audience can view the output to monitor the game's status.

Winners' prizes may be based on how fast a player or players successfully complete a task. Other variations of the game may award prizes based on how far down a player branch a player is located and whether that player is the actual player in the branch that successfully completed the task. Prizes may also be based on a difficulty level of the task.

BRIEF DESCRIPTION OF THE DRAWINGS

The present invention is described with respect to the accompanying figures, in which like reference numerals identify like elements, and in which.

DETAILED DESCRIPTION OF THE INVENTION

In the following description of the various embodiments, reference is made to the accompanying drawings which form a part hereof, and which is shown by way of illustration various embodiments in which the invention may be practiced. It is to be understood that other embodiments may be utilized and structural and functional modifications may be made without departing from the scope of the present invention.

Figure 1:
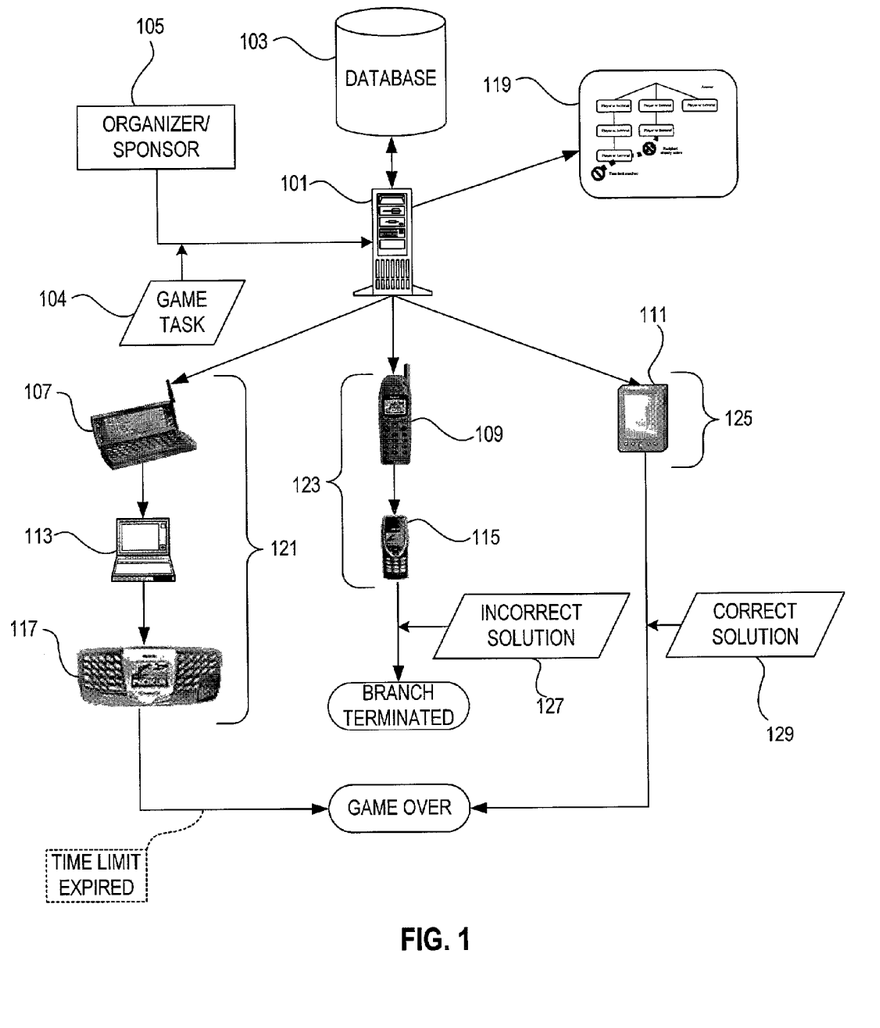
FIG. 1 illustrates a data flow diagram according to an embodiment of the invention.

FIG. 1 illustrates a high-level data flow diagram of a system for playing a game according to a first embodiment of the invention. The system may include a game server 101, game database 103, game sponsor 105, and mobile terminals 107–117. Game server 101 may be any data processing system, such as a conventional computer, network server, or the like, that controls and administers the game to players via each player's mobile terminal. Game server 101 may store or be in communication with game database 103, which stores player, task, hint, and game status information. Game server 101 may provide output 119 indicating the status of an active game. A game organizer or sponsor 105 may provide a game task 104 to game server 101. The game sponsor may be any entity that provides a game task to game server 101, that awards prizes to winning players, etc. Each mobile terminal 107–117 may be a mobile telephone, personal digital assistant (PDA), laptop computer, desktop computer, personal communicator such as a Nokia Communicator, MP3 player with integrated wireless communications, or the like.

Game server 101 initiates a game by distributing task 104 to a first set of game players via their mobile terminals 107, 109, and 111, each of whom may provide a response to the task or forward the task to a different player. Each task may comprise a question, a request to perform a mental or physical task, or the like, as further described below. After game server 101 initiates a game, the game is said to be active. The game ends when a player provides a correct response, when a game time limit expires, or when all players with the task provide incorrect responses, whichever occurs first. Alternatively, the game may end only when the game time limit expires, regardless of the number of responses (correct and incorrect) received.

As stated above, players may pass the task by forwarding the task to another player or players. A player may forward the task by requesting the game server forward the task to a specific player, or by having the game server automatically pick a player to whom the task is forwarded. In one embodiment, after a player forwards the task, the player loses the ability to respond to the task. That is, each player can either forward the task or respond to it, but not both. Alternatively, players may provide a response to a task even after they have forwarded the task to another player, or vice versa.

In one variation of the game, players can forward the task only to a player that has not already received the same task. This creates player branches 121, 123, and 125, each of which comprises mutually exclusive mobile terminals (i.e., players). For example, FIG. 1 illustrates that first, second, and third players associated with mobile terminals 107, 109, and 111 initially receive game task 104, establishing player branches 121, 123, and 125, respectively. First player using mobile terminal 107 may forward task 104 to a fourth player associated with mobile terminal 113, who in turn may forward task 104 to a fifth player associated with mobile terminal 117. If a time limit for the game expires before the fifth player can respond to or forward the task, then the game ends.

Second player using mobile terminal 109 may forward the task to a sixth player using mobile terminal 115. If the sixth player using mobile terminal 115 submits an incorrect task response 127 to server 101, player branch 123 may be terminated (i.e., the sixth player using mobile terminal 115 cannot further forward the task). If third player using mobile terminal 111 submits a correct response 129 before a time limit for the game expires, he wins the game.

Players associated with mobile terminals 107, 113, and 117 may be referred to as first, second, and third generation players, respectively, of first player branch 121. Players associated with mobile terminals 109 and 115 may be referred to as first and second generation players, respectively, of second player branch 123. A player associated with mobile terminal 111 may be referred to as the first generation, and only, player of third player branch 125.

While FIG. 1 demonstrates that the game may end due to either a time limit expiring or a player submitting a correct response, these events are mutually exclusive in one preferred embodiment. However, another embodiment of the invention may provide for each player branch being given an individual time limit in which to solve the task. For example, after the sixth player using mobile terminal 111 submits a correct response, players in other task branches may continue to either submit responses or forward the task as long as there is time remaining in the game. Any player in a player branch that submits a correct response before the time limit ends may receive a prize or, alternatively, may proceed to receive another task. In still another embodiment, where players may both respond to and forward a task, the winning player or players may be based on which task branch had the most players submit the correct answer, or on which task branch had the highest percentage of correct answers submitted by its players.

Alternatively or in addition to global time limits discussed above, time limits may be player-specific, and the game may continue until no players have any time left, all players have submitted incorrect responses, or a correct response is submitted to game server 101. When both global and player-specific time limits are in use, game server 101 may terminate a player branch if a player does not forward the task before the player-specific time limit expires. Alternatively, game server 101 may automatically forward the task to another player when a player's player-specific time limit expires and there is time remaining in the global game time limit.

The game sponsor 105 may give a prize (not shown) to one or more winning players. In one embodiment, the winning player is the first player that submits the correct response. In another embodiment, all players belonging to a task branch from which the first correct response originated may receive a prize. Prizes may further be determined based on a player's generational level within a player branch, whether a player in a player branch was the specific player that submitted the correct response, a difficulty level of the task, whether any of the players in the player branch received a hint (described below), or the like.

Each game task may comprise a question or other information to which a response can be provided. A game task's and response's subject matter may comprise art, literature, mathematics, science, foreign languages, movies, pop culture, history, geography, and the like. For instance, the correct response to the game task "What is the title of Robin Wright's first movie?" might be "The Princess Bride." A game task may also or alternatively comprise instructions for completing a physical or mental task, and for providing a response that proves to an acceptable degree of certainty that the task was completed. For example, the game task may comprise driving instructions to a predetermined location, as well as a request for the name of a building to which the directions lead. Responses to the task may be messages comprising the name of a building. If the building name provided in a response matches the name of the building to which the directions lead, the game server may presume that the player that sent the matching response completed the task.

In one example, the task may comprise audio and/or video data that is played over the mobile terminal's speaker and/or display screen, respectively. For instance, the task may comprise a photograph of a famous celebrity, and the correct response might include the name of the celebrity. Alternatively, the task may comprise a request for specific audio and/or video data recorded using a microphone and/or built-in camera on the mobile terminal, respectively. For instance, the task may comprise a request for a picture of a specific object or location, such as a Volkswagon Beetle automobile. The correct response might comprise a photo of a VW Beetle taken with a digital camera built-in to the mobile terminal.

In another example, each player on a task branch may receive a subtask of an master game task. For instance, the game task may comprise composing a funny story, where each player builds on the responses of the players in her task branch responding before her. In another example, the task may comprise submitting voice recordings corresponding to requested information (e.g., first player submits a noun, second player submits a verb, third player submits an adjective, etc.), so that when the voice recordings are played in a specific sequence, the answer or story emerges. In such an embodiment, where subtasks are used, the winning player or players might not be determined until receiving all task responses from all the players in each task branch.

In yet another example, the game task may include a mathematical equation with one or more missing values replaced with variables, as is known in the art. The game task may further provide instructions for determining the value of each variable. After all the variables have been determined, the equation can be solved for a numerical result. Each task response may be a message comprising a numerical value. When the server receives a response with a numerical value matching the numerical value calculated using the equation populated with the correct variables, the game server may presume that player that sent the matching response completed the task. The above examples are merely illustrative. It will be appreciated by those of skill in the art that any game task may be used where a response proves to an acceptable degree of certainty that the respondent completed the task.

Throughout the duration of a game, game server 101 may provide real time output 119 indicating the status of active and/or completed games. Output 119 may include player branch information, time limit information, and/or demographical information of various player (e.g., name, photo, etc.). Output 119 may comprise a video signal that displays game status information on a television, computer monitor, display screen, electronic billboard, or the like. In some embodiments, game server 101 may provide output 119 to a web server (not shown), allowing individuals to view game status information over a computer network such as the Internet. In some embodiments, game server 101 provides output 119 to mobile terminals in a wireless telecommunications network. In some embodiments, the output may differ based on the recipient. For example, one task branch may receive different output than another task branch, or the general audience may receive different output than that received by mobile terminals in task branches.

Figure 2:
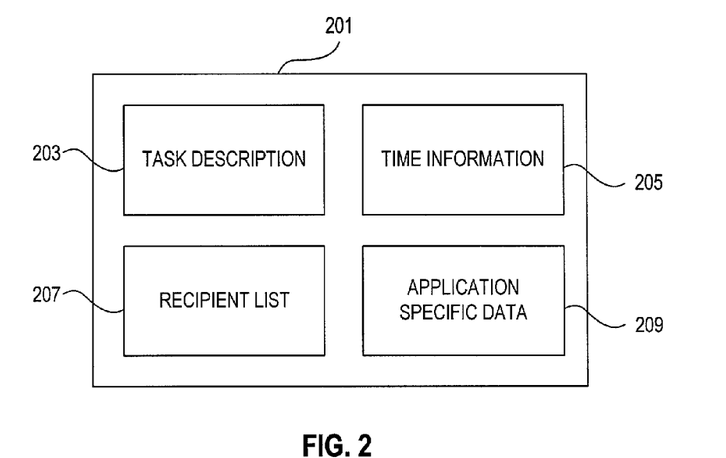
FIG. 2 illustrates a task message according to an embodiment of the invention.

With further reference to FIG. 2, a game server initiates the game by sending task message 201 to a first generation of players' mobile terminals. Task message 201 may include task description data 203, time limit information 205, recipient list 207, and application specific data 209.

Task description data 203 represents the game task in textual and/or audiovisual form according to the audiovisual capabilities of each mobile device. This data is used to present the task to a user of the mobile terminal using the mobile terminal's display screen and speaker. Time limit information 205 may include global and/or player-specific time limit information, depending on the variation of the game being played.

Recipient list 207 may identify those players to whom the mobile terminal may forward the task. For example, recipient list 207 may include a list of mobile terminals associated with players on a same team as the player associated with the current mobile terminal. Alternatively, recipient list 207 may include a class of players to whom the task may be sent. For example, recipient list 207 may indicate that the task may be forwarded to any player on a team with a specific name, or to any mobile device belonging to a player meeting predefined criteria, e.g., players meeting certain demographic criteria, players that are registered with game server 101 to play the specific game with which the task is associated, etc. Alternatively, recipient list 207 may be stored in game database 103, and game server 101 may determine whether a task recipient is valid based on the information stored in the game database. In some embodiments, the recipient list may be updated whenever the task is forwarded to another player, showing only valid recipients for the player presently attempting to solve the task.

Application specific data 209 may optionally be used to convey game and/or task information to game-related application software on each mobile terminal. For example, data 209 may comprise an address or game server identification to which the mobile terminal may send its response or forward request. For example, data 209 may include an IP address, SMS recipient, or the like.

Task and response messages may be sent between the server and mobile terminals using any known data messaging techniques. In one embodiment, short message service (SMS) messages may be used, where a text message includes the necessary information for the variation of the game being played. For example, the type of message might be determined by a keyword at the beginning of the SMS message (e.g., "ANSWER JAMES BOND" or "FORWARD +3585102020"). Time limit and other instructions may be included as part of the SMS message, and time management may be performed by the server.

In another embodiment, a browser on the mobile terminal may be used. A web page containing the task and response options may be sent to the mobile terminal, for example, using WAP push capabilities. Alternatively, the user of the mobile terminal may browse to the web page through one or more hyperlinks from the server's home web page. The terminal may send the response to a web or WAP-enabled task server using HTTP over the wireless carrier.

Figure 3:
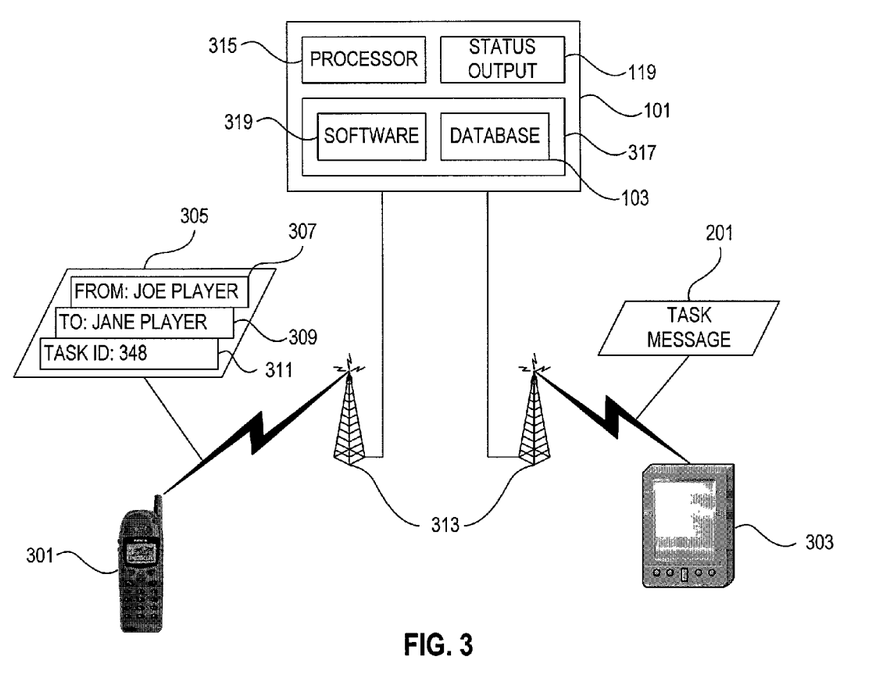
FIG. 3 illustrates a data flow diagram of a task forwarding process according to an embodiment of the invention.

With reference to FIG. 3, when a first player 301 wants to forward a task to a second player 303, first player 301 sends a forward request 305 to game server 101 via network 313, such as a wireless telecommunications network, Internet, LAN, WAN, or the like. Game server 101 may include a processor 315, output port 119, and memory 317 for storing game administration software 319 and game database 103.

Forward request 305 may comprise sending player ID 307, recipient player ID 309, and task ID 311. Upon receiving forward request 305, game server 101 validates the request by determining whether recipient player ID 309 is valid. In one embodiment, game administration software 319 in game server 101 determines recipient validity by querying game database 103 for recipient player ID 309 and, if found, determining whether the player with recipient player ID 309 has already received the task and, optionally, whether the player with recipient player ID 309 is on the same team as the player with sending player ID 307. If the recipient is valid, game server 101 sends task message 201 to a mobile terminal 303 associated with a player identified by recipient player ID 309, and updates the player branch by including the player at the next generational level after the sender's generational level. Game server 101 may also update output 119 to reflect the new player receiving the task.

In one embodiment, when the intended recipient is not a valid recipient (e.g., the intended recipient is not registered with the game server or has already received the task and is thus a member of another player branch), game server 101 may terminate the player branch from which the forward request originated. In another embodiment, game server 101 may send an error message to the sending mobile terminal 301 indicating that the intended recipient 309 is not a valid recipient, and mobile terminal 301 may attempt to forward the task to another player if there is any time remaining.

Task ID 311 is optional, and may be used by game server 101 to identify the game to which forward request 305 refers when game server 101 administers multiple games simultaneously or when each player may simultaneously play more than one active game. Alternatively, game server 101 may determine to which game each forward request 305 refers by looking up the sending player's ID 307 in database 103 (FIG. 1).

In some variations of the game, players may receive hints while a game is active. Players may receive hints from the game server, other players, audience members, and/or the game sponsor. Game server 101 may automatically send to players preprogrammed hints stored in database 103. Game server 101 may provide the automated hints at predetermined or random time intervals, or at the occurrence of a predetermined condition (e.g., when the task has been forwarded a specified number of times). Players may send hints to each other by sending messages, such as SMS, Bluetooth, short-range RF, Infrared, or other wireless data messages, from one mobile terminal to another. An audience member may send a hint to a specific player, based on the game status information 119. The game organizer may send a hint to a single player, all players of a specified player branch or team, or all players in an active game.

In one embodiment, the game may be played in a cross-media environment. The game task and responses may be sent over the wireless communications network, while supplemental information may be transmitted over a broadcast network, such as radio, television, DVB, etc. For example, suppose a game sponsor is a radio station. A disk jockey (DJ) at the radio station may be conducting an interview of a celebrity over a radio broadcast. The game task may be a question pertaining to that celebrity, and sent to the players over the wireless communications network. The game may be initiated at the beginning of the interview and the radio DJ may announce that a game is being launched according to any variation of the invention as taught herein. Subsequently, during the course of the on-air interview, the DJ and/or the celebrity may provide hints to players that they may receive via traditional radio broadcast signals. For example, a player may receive the radio hints via her mobile terminal when the mobile terminal is a cross-media mobile terminal equipped with a radio receiver as well as two-way wireless communications, or via a separate radio-receiving device. Alternatively, a player may receive hints from the game sponsor via data messages or the like via the wireless communications network, as discussed herein. In addition, the DJ may provide general game information to all radio listeners during her radio broadcast.

In another example, suppose a game sponsor is a sports team, and a game is initiated within a sports stadium, such as a football stadium. The game may be restricted to players within the stadium by displaying a game ID or password on a big display screen in the stadium and requiring players to register for the game with a game server within a short time period. Alternatively, the game may be restricted to players in the stadium by using short-range communications techniques, e.g., Bluetooth and WLAN, for communicating between the server and the mobile terminals. The game task may relate to the sponsor, e.g., what player has scored the most points this season? After the game is initiated, updated game status information 119 may be displayed on the big display screen in the stadium so that spectators can view the game status as it progresses. In addition, if players provide their seat information when they register, players presently attempting to solve the task may be displayed on the big screen using broadcast TV cameras in the stadium. When the winning player is using a mobile terminal that stores images associated with contact information, the game server may further display on the display screen an image (e.g., a photo of the player) sent by the winning player's mobile terminal to the game server.

Figure 4:
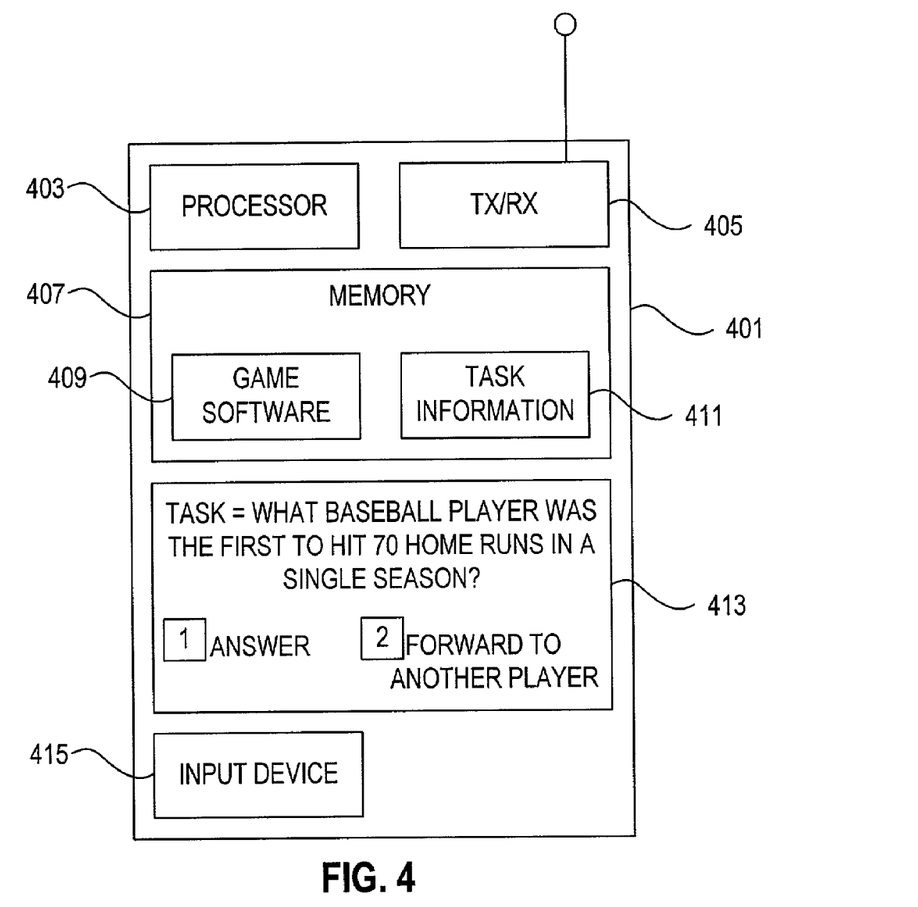
FIG. 4 illustrates a block diagram of a mobile terminal that may be used with one ore more embodiments of the invention.

FIG. 4 illustrates a block diagram of a mobile terminal 401 that may be used in an embodiment of the invention. Mobile terminal 401 includes a processor 403, transceiver 405, memory 407, display screen 413, and input device 415. Memory 407 may store game-specific application software 409 and task information 411. Processor 403 may be used to control overall operation of mobile terminal 401, and to execute application software 409. Transceiver 403 may be used to receive task information 411 from and send responses and forward requests generated by application software 409 to a game server. Task information 411 may comprise information received in task messages (FIG. 2), and is used by application software 409. Application software 409 controls receiving task messages, interaction with a user of the mobile terminal via display screen 413 and input device 415 (e.g., a keypad), and sending responses and forward requests to the game server. In one embodiment, application software 409 integrates messaging and task response functions. That is, the software automatically generates a response or a forward request based on user input, and automatically sends the message to the game server using a data messaging service, such as SMS, HTTP, and the like.

In one embodiment, application software 409 is created using Java MIDP, and the application software may be sent to mobile terminal 401 as the user of the mobile terminal registers with the task server. In another embodiment, application software 409 may be native to the mobile terminal, running on top of the mobile terminal's operating system (not shown), such as Pocket PC, EPOC, and the like. The application may have access to system functionality such as security and timing services, making it possible to control portions of the game from the mobile terminal.

For example, in one embodiment, the terminals may forward task information and a list of participants of previous generations to the next player. Only the final player of a branch (the one submitting the answer), might send a response to the server. The server may determine from the number of steps and elapsed time whether the game has proceeded according to time limits as well as determine the winning player or players.

Figure 5:
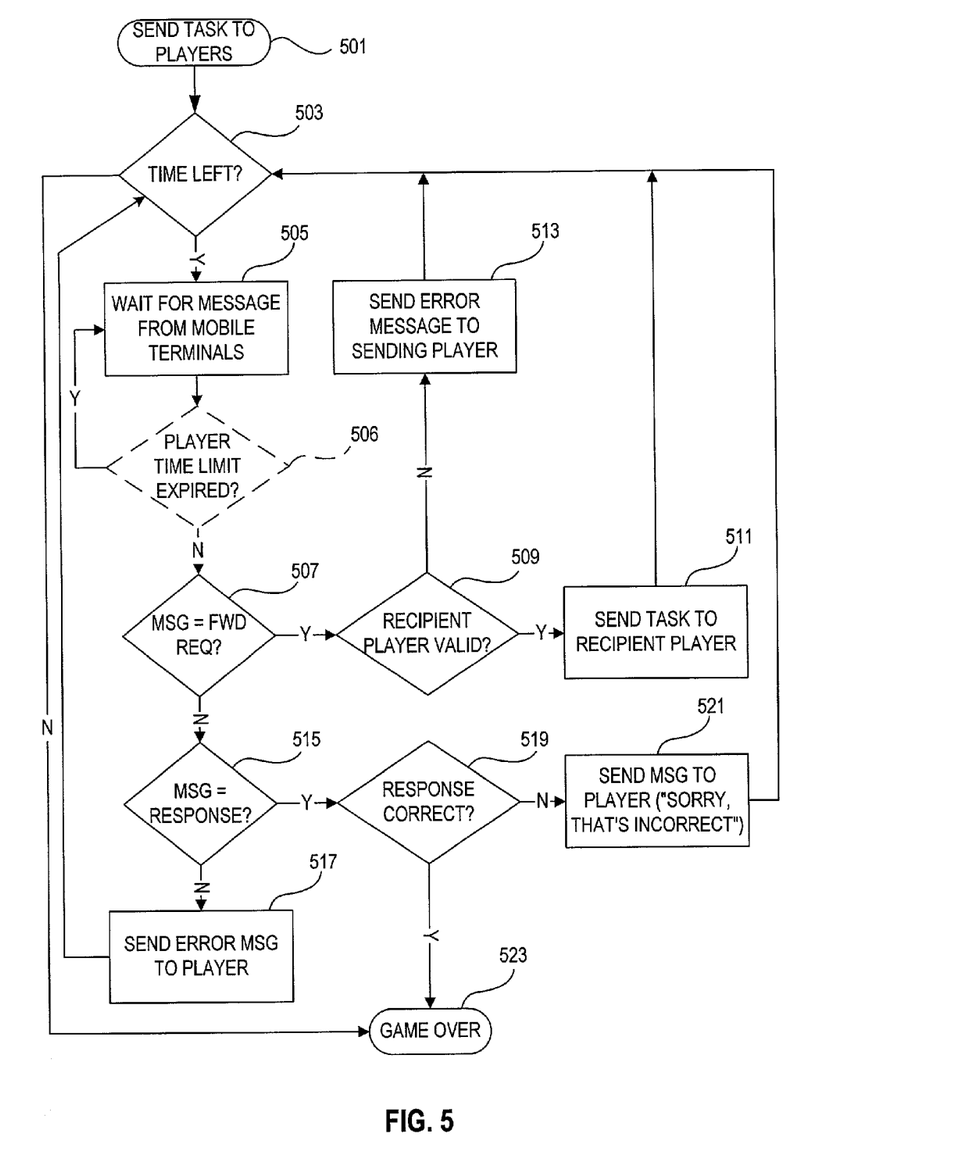
FIG. 5 illustrates a method performed by a task server according to an embodiment of the invention.

FIG. 5 illustrates a method performed by a game server according to one embodiment of the invention. The game server initiates the game in step 501 by sending the task to an initial group of players. While there is time remaining in the game, as indicated in step 503, the game server waits to receive messages from mobile terminals that have received the task, in step 505. When there is no time remaining in the game, the game ends in step 523.

Upon receiving a message from a mobile terminal, the game server determines whether the message is a request to forward the task to another player, in step 507. If the message is a forward request, the game server validates the recipient in step 509 and, when the recipient is valid, sends the task to the recipient in step 511. After sending the task to the recipient, the game server returns to step 503. When the recipient is not valid (step 509), the game server may send an error message to the sending mobile terminal in step 513, and then return to step 503.

If the message is not a forward request, as determined in step 507, the game server determines whether the message is a task response, in step 515. If the message is not a task response, the game server may send an error message to the mobile terminal of the player that sent the message, indicating that the game server does not understand the message, in step 517. If the message is a task response, the game server validates the response in step 519. If the response is incorrect, the game server may send a message to the player's mobile terminal, indicating the response was incorrect, in step 521. If the response is correct, the game ends in step 523.

One of skill in the art will appreciate that FIG. 5 illustrates the basic steps performed by the game server, and that more or fewer steps may alternatively be used, and that the steps may be performed in other than the recited order. For example, error message steps may be optional, or additional error checking steps may be added. Other steps may be performed according to differing game variations, e.g., team games, games with multiple rounds, etc. In one variation, optional step 506 is performed when the server receives a message from a mobile terminal. In optional step 506, the server checks to determine whether the player specific time limit has expired for the player from whom the message was received. If the player specific time limit has expired, the server ignores the message and continues waiting for messages from other players. If the player specific time limit has not expired, the server continues to step 507 as normal. Optionally, not shown, the server may send an error message to a mobile terminal from which a message is received after the player specific time limit has expired. Alternatively, individual mobile terminals adapted with application software for performing as taught herein may enforce the player specific time limit.

As previously discussed, in some embodiments of the invention players may form teams for competing in games as taught herein. Teams may be manually formed by players when they register with the game server, or the game server may automatically assign players to specific teams. That is, a player may request to be on Red Team, or the game server may automatically assign a player to a team needing more players. In one embodiment, Bluetooth or other local network technologies may be used in the formation of teams. When the game server sends a task to a first mobile terminal, the first mobile terminal may poll, or query, the surrounding area for other nearby mobile terminals. Any nearby mobile terminal that responds may be added to the first mobile terminal's team.

In embodiments using teams, one or more team rules may be enforced by the game server, including rules indicating that team members may only forward a task to a teammate, and that team members can request hints from teammates. An additional team rule that may be enforced is that all team members may attempt to solve the task, and the final task solution for submission to the game server may be chosen by the players voting within the team. Teams may be based on a common association of individuals (e.g., members of a club), or based on any other criteria (e.g., men versus women). In some embodiments, virtual teams may be created by forming teams based on user abilities (e.g., exceptional math skill, knowledge of old movies, etc.). A virtual team is referred to as such only because the players may not directly know one another prior to forming the team. In one embodiment, teams can challenge other teams to solve a task, and the game is only available to participating teams.

Many variations of the invention may easily be envisioned by those of skill in the art. For example, in one variation players may forward tasks directly to other players without relaying the request through a game server. In such an embodiment, each mobile terminal may determine whether a recipient is valid based on recipient list information.

In another variation, one or more players may use a stationary terminal to play the game. For example, a player may be able to register using a conventional computer via a web browser directed to the game server's (or sponsor's) web site. The player may receive tasks and send responses and forward requests via email, web service messages, or the like. Alternatively, a stationary user may be located in a studio audience watching a host commentate on an active game. For example, audience members may form one team, and mobile users may form another, each team competing for a prize.

It will also be appreciated by one of skill in the art that the above-disclosed inventive principles may be used for other than entertainment purposes. Corporations, research entities, educational institutions, and the like may distribute requests and/or inquiries using a centralized task server. For example, a first scientist may require a quick answer to a specific question. The first scientist may submit the task the task server, which then sends the task to other scientists (optionally identified by the first scientist as likely to know the answer). If a second scientist that receives the task knows the answer, she may submit a task response that the task server forwards to the first scientist. If, however, the second scientist does not know the answer, but knows an individual who might, the second scientist may forward the task to that individual. The chain may continue until the first scientist receives an acceptable answer and informs the task server that the task server may terminate that task. Other variations are also possible.

While the invention has been described with respect to specific examples including presently preferred modes of carrying out the invention, those skilled in the art will appreciate that there are numerous variations and permutations of the above described system and techniques that fall within the spirit and scope of the invention as set forth in the appended claims.

We claim:

1. A mobile terminal, comprising:
   a processor,
   a transceiver; and
   memory for storing computer readable instructions that, when executed by the processor, cause the mobile terminal to perform steps comprising:
   (i) receiving a task;
   (ii) providing two response options to a first player using the mobile terminal, comprising:
      a. forwarding the task for delivery to a second mobile terminal; and
      b. sending a response to the task to a task server;

(iii) receiving a player input selecting a one of the two response options; and (iv) performing the selected response option.

2. The mobile terminal of claim 1, wherein the computer readable instructions further cause the mobile terminal to perform the step of, upon completion of step (iv), displaying an error message when the player attempts to perform another response option.

3. The mobile terminal of claim 1, wherein in step (iii), when the first player selects said response option (a), said player input comprises an identity of a second player.

4. The mobile terminal of claim 3, wherein in step (iii), the second player is one of a group of players that have not already received the task.

5. The mobile terminal of claim 3, wherein in step (iii), the second player is one of a group of players on a same team as the first player using the nubile terminal.

6. The mobile terminal of claim 3, wherein in step (iii), the second player is one of a group of players registered with the task server.

7. The mobile terminal of claim 1, wherein in step (iii), when the first player selects said response option (b), said player input comprises response information.

8. The mobile terminal of claim 7, wherein in step (i) the task comprises a question and, in step (iii) said response information comprises an answer to the question.

9. The mobile terminal of claim 7, wherein in step (i) the task comprises a physical task and, in step (iii), said response information comprises data proving that the physical task was completed.

10. The mobile terminal of claim 7, wherein in step (i) the task comprises audio data, video data, or audio and video data and, in step (iii), said response information corresponds to the audio and/or video data.

11. The nubile terminal of claim 7, wherein in step (iii), said response information comprises audio data, video data, or audio and video data recorded by the mobile terminal.

12. The mobile terminal of claim 1, wherein the computer readable instructions further comprise the step of only performing steps (ii)–(iv) within a predetermined amount of time of step (i).

13. The mobile terminal of claim 1, wherein the task comprises a game task.

14. A method fur solving a task using a mobile terminal, comprising steps of:
(i) the mobile terminal receiving the task from a game server; and
(ii) the mobile terminal providing response options to a user of the mobile terminal, said response options comprising:
 a. submitting a task response to the game sewer, and
 b. forwarding the task to a different mobile terminal; and
(iii) the mobile terminal performing one of a. and b. based on input received from the user of the mobile terminal.

15. The method of claim 14, wherein step (iii) must be performed within a predetermined amount of time after step (i).

16. The method of claim 14, wherein in step (ii)(b) the different mobile terminal is one of a plurality of mobile terminals on a same team as the mobile terminal of step (i).

17. The method of claim 14, wherein in step (ii)(b) the different mobile terminal is one of a plurality of mobile terminals that has registered with the game server.

18. The method of claim 14, wherein in step (i) the task comprises a question and, in step (ii)(a), the task response comprises an answer to the question.

19. The method of claim 14, wherein in step (i) the task comprises audio data, video data, or audio and video data and, in step (ii)(a), the task response comprises information corresponding to the audio data, video data, or audio and video data.

20. The method of claim 14, wherein step (ii)(a) comprises the mobile terminal recording audio data, video data, or audio and video data corresponding to the task.

21. A mobile terminal, comprising:
a processor,
a transceiver;
a display screen;
an input device; and
memory for storing computer readable instructions that, when executed by the processor, cause the mobile terminal to perform the steps of:
 (i) receiving game task information from a game server;
 (ii) displaying a game task and two response options on the display screen, wherein the two response options comprise:
  a. passing the game task to another player; and
  b. responding to the game task;
 (iii) when receiving a user input via the input device indicating a user selects said response option (a), sending a forward request to the game server; and
 (iv) when receiving a user input via the input device indicating the user selects said response option (b), sending a message comprising a response to the game task to the game server.

\* \* \* \* \*